United States Patent
Hoyle

(10) Patent No.: US 7,002,316 B2
(45) Date of Patent: Feb. 21, 2006

(54) VEHICLE HVAC DOOR WITH ENCLOSED MOTOR

(75) Inventor: Richard Hoyle, Orion, MI (US)

(73) Assignee: Air International (US) Inc., Auburn Hills, MI (US)

( * ) Notice: Subject to any disclaimer, the term of this patent is extended or adjusted under 35 U.S.C. 154(b) by 0 days.

(21) Appl. No.: 10/927,557

(22) Filed: Aug. 26, 2004

(65) Prior Publication Data

US 2005/0046377 A1 Mar. 3, 2005

Related U.S. Application Data

(60) Provisional application No. 60/498,075, filed on Aug. 27, 2003.

(51) Int. Cl.
*G05B 19/40* (2006.01)

(52) U.S. Cl. ............ 318/685; 318/696; 318/449; 62/278

(58) Field of Classification Search .......... 318/685, 318/696, 445, 449, 450, 466, 468; 62/278
See application file for complete search history.

(56) References Cited

U.S. PATENT DOCUMENTS

| | | | |
|---|---|---|---|
| 3,404,835 A | * | 10/1968 | Rodgers ............ 236/13 |
| 4,815,658 A | * | 3/1989 | Hidemitsu et al. ......... 237/2 A |
| 5,284,025 A | * | 2/1994 | Kajitani et al. ............. 62/160 |
| 5,517,101 A | * | 5/1996 | Sakai et al. ............... 318/685 |
| 5,529,112 A | * | 6/1996 | King et al. ............... 165/11.1 |
| 6,048,263 A | * | 4/2000 | Uchida et al. ............. 454/121 |
| 6,230,795 B1 | * | 5/2001 | Tsunooka et al. .......... 165/203 |

OTHER PUBLICATIONS

"Product Briefs," aei May, 2003.
Article: "Miniature Servo Drive System for Air Condition Controls and Test Rig for Dynamic Testing of Small Torques", AM AA2003 Artikel.

* cited by examiner

*Primary Examiner*—Rina Duda
(74) *Attorney, Agent, or Firm*—Carlson, Gaskey & Olds

(57) ABSTRACT

A drive for a vehicle HVAC vent door includes a drive transmission mounted within the shaft for the vent door. The drive transmission is of the sort commonly known as a wave drive transmission, wherein a lobed member is driven by an oblong drive shaft. The lobed member selectively drives an externally threaded flex ring that in turn engages an internally toothed drive transmission member. The internally toothed drive transmission member drives the shaft for the vent door. In this fashion, a relatively small motor is provided which has sufficient power to drive the vent door. Further, an electrical connection for supplying control signals is mounted at one end of the shaft and has a non-symmetrical configuration such that the motor and vent door will be properly orientated and relative to the vehicle.

22 Claims, 2 Drawing Sheets

VEHICLE HVAC DOOR WITH ENCLOSED MOTOR

RELATED APPLICATION

This application claims priority and benefit to provisional application No. 60/498,075 filed Aug. 27, 2003, the disclosure of which is incorporated herein by reference.

BACKGROUND OF THE INVENTION

This invention relates to an HVAC door wherein the motor for pivoting the door is enclosed within a shaft for the door or mounted to a case that houses the door.

HVAC systems are typically included in all modern vehicles. The systems include an air conditioning and heater system for selectively directing heated and cooled air to the cabin of a vehicle as requested by an operator. Among the many components in an HVAC system for modern vehicles are so-called mode and temperature doors. A mode or temperature door is typically positioned along the flow path for air between the HVAC system and the vehicle cab.

One type of door controls what outlets the air is directed to. The outlets distribute air to the face, to the feet, or to defrost. Thus, the operator must select for the air to be directed to the "face," to the "feet" or to some combination. A mode door pivots upon the request by an operator to direct the air as requested. A second temperature door application either directs all heated, all cooled, or some mixture of heated and cooled air to the cab to meet the temperature requested by the operator.

To date, these doors have been powered by solenoids, or other relatively complicated and large actuators containing a worm drive or similar gearbox. These mode or temperature door actuators are often mounted in crowded space, such as the vehicle instrument panel. Thus, it would be desirable to reduce the size of the actuators.

So called "wave drive" technology, such as shown for example in U.S. Pat. No. 2,906,143, is known, and has been proposed for many applications. One application is the selectively opened or closed vents leading from an HVAC channel into the cab of a vehicle. However, prior to the invention disclosed in this application, applicant is unaware of the use of such a wave drive motor to drive a mode or temperature door door.

SUMMARY OF THE INVENTION

In a disclosed embodiment of this invention, a motor for driving a vent door is housed within the shaft for pivoting the vent door. Thus, no additional space is required other than that which was already required for the mode or temperature door. Another embodiment disclosed in this invention would be the motor for driving the vent door being located outside of a case to which the door is attached.

In a preferred embodiment, the motor includes a wave drive transmission between the drive motor and the pivoting door. The particular wave transmission envisioned as the most preferred includes a lobed member having a central bore. An oblong drive shaft is received within the central bore, and is driven to rotate by the motor. As the oblong drive shaft rotates, it alternatively forces consecutive ones of the lobes into engagement with an outer flexible ring member. The outer flexible ring member is caused to rotate, and is in turn connected by teeth to a second outer member. The second outer member is fixed to drive the shaft of the vent door. Thus, as the motor drives to rotate its oblong shaft, it in turn drives the vent door shaft. A control is connected to the motor through a connection which has a unique shape. The unique shape ensures that the motor and hence the vent door will be connected in the appropriate orientation. Further, a feedback sensor for providing feedback of the actual position of the vent door is included within the motor and within the shaft. The feedback mechanism could be based on a photointerupter, Hall effect sensor, pulse count or resistive strip principles. Alternatively, a stepper motor could be used instead of a traditional DC motor to provide both a method of feedback and power.

These and other features of the present invention can be best understood from the following specification and drawings, the following of which is a brief description.

DETAILED DESCRIPTION OF THE PREFERRED EMBODIMENT

Figure 1:
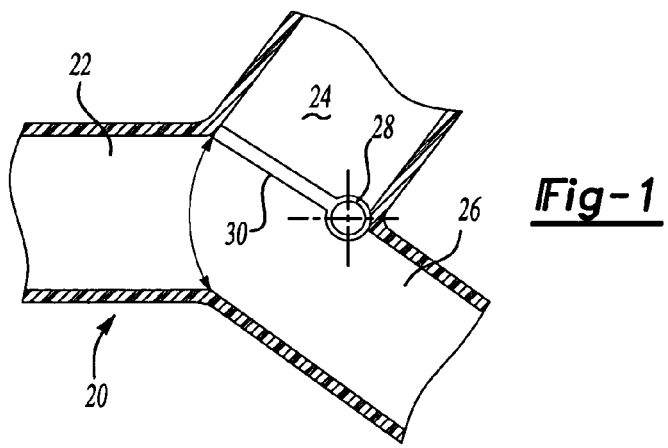
FIG. 1 is a highly schematic view of one portion of an HVAC system.

As shown in FIG. 1, a flow portion 20 of a vehicle HVAC system includes a first flow line 22 communicating with alternative line 24 and 26. As mentioned above, line 22 can supply air to either of line 24 or 26, such that air can be directed to vertically upper or lower positions within the cab. Alternatively, lines 24 and 26 can selectively supply heated and cooled air to a downstream line 22. In either case, a door is driven to pivot about a shaft 28 and has a door 30 for selecting which of the two lines 24 and 26 communicate with the line 22, or whether some mixing will occur between lines 24 and 26 in the line 22. The details of how to control such mixing are within the skill of a worker in this art.

Figure 2A:
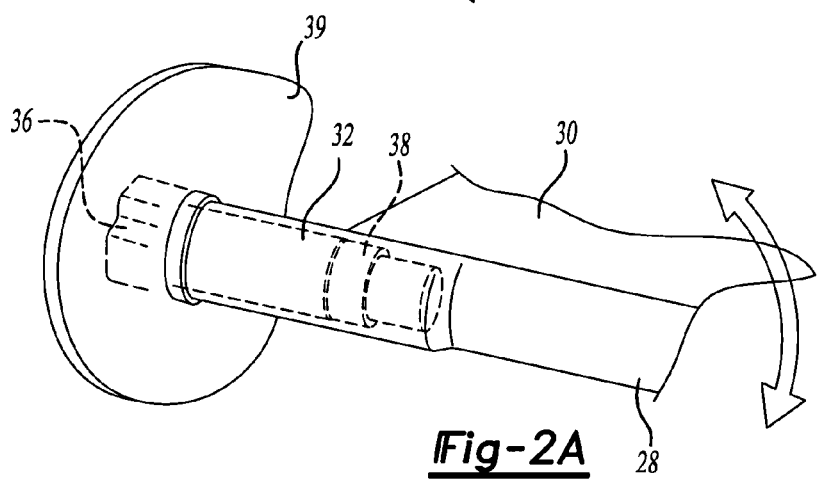
FIG. 2A is a perspective cut-away view of an inventive embodiment.

As can be appreciated from FIG. 2A, this invention mounts a motor 32 for driving the vent door to pivot in the shaft 28. An electrical connection 36 is mounted at the end of the motor 32, and provides/receives control instructions to the motor 32. As shown also, a drive transmission 38 is driven to rotate by the motor 32 and is also fixed within the shaft 28 such that it drives the door 30. As can be appreciated from FIG. 2A, the motor 32 is received entirely within the shaft mount. Thus, additional space is not necessary. In an alternate embodiment the motor 32 can be mounted behind a wall 39 of the HVAC channel where the door 30 is mounted. In this embodiment the motor 32 is incorporated into the shaft mounting on the opposing side of the wall 39 from the door 30.

Figure 2B:
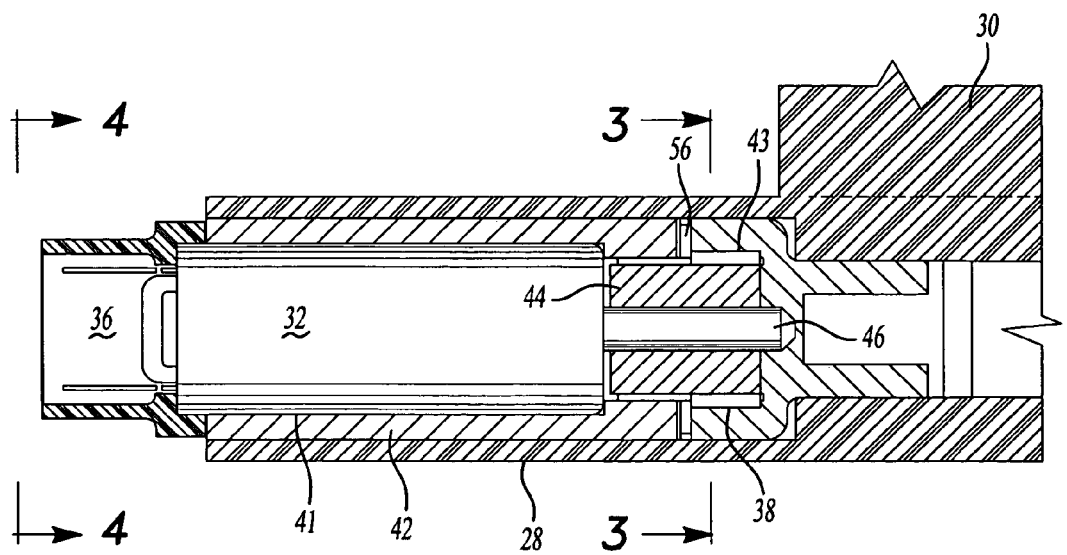
FIG. 2B is a cross-sectional view.

As can be appreciated from FIG. 2B, the motor 32 is fixed within a fixed portion 41, and drives a lobed wave actuator 44 through its shaft 46. A ring 42 is driven by the lobed actuator 44, and in turn drives the transmission 38. The transmission 38 is fixed to drive the shaft 28. The addition of a small planetary gear set within the wave actuator 44 could also be added to further increase the ratio. Also, a position sensor 56 communicates the position of the shaft 28 back to either motor 32 or a control. The position sensor 56 can be any type of feedback mechanism such as a photo-interupter, Hall effect sensor, or use pulse count or resistive strip principles. Alternatively, a stepper motor could be used instead of a traditional DC motor 32 to provide both a method of feedback and power.

As can be appreciated from this figure, no additional space is required for the inclusion of the motor 32. Rather, the motor 32 is incorporated within the space typically already required by the shaft 28.

Figure 3:
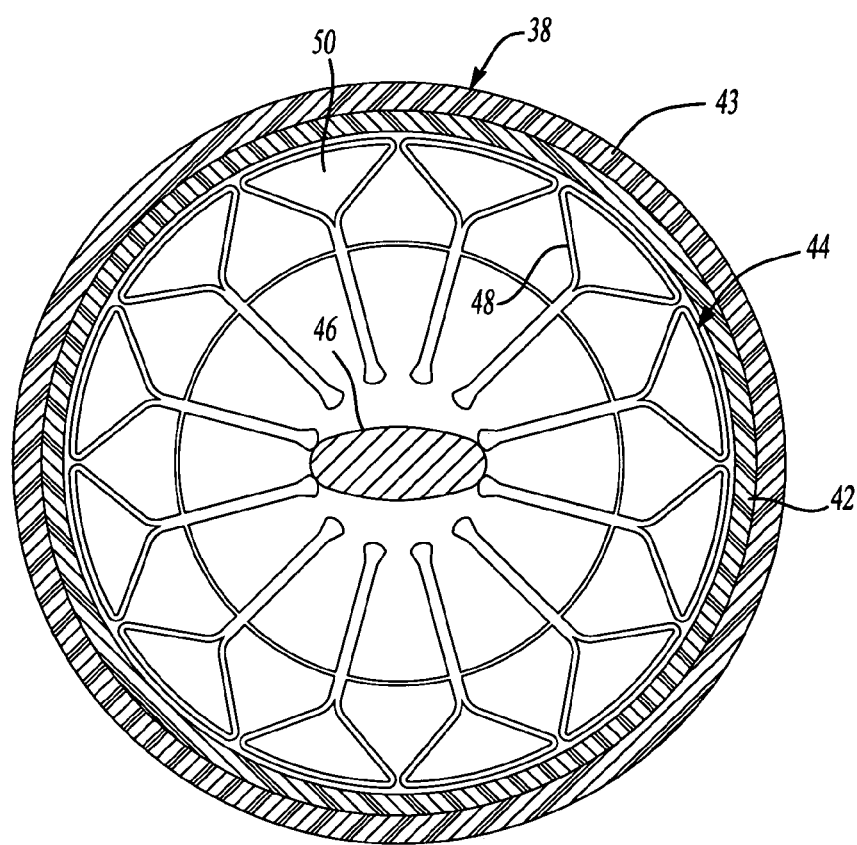
FIG. 3 is a cross-section view along line 3—3 as shown in FIG. 2B.

As can be appreciated from FIG. 3, the drive shaft 46 is actually oblong. Thus, as it rotates, its outermost extents selectively drive alternating ones of the lobes 48 and 50 and the lobed transmission ring 43 into engagement with the ring 42. There is a toothed connection between rings 42 and 43 such that as ring 42 is driven to rotate, it in turn rotates ring 43. This type of drive transmission is known, and can be best understood for example by visiting a web page of its inventor and manufacturing company, Oechsler, at www.Oechsler-ag.de. The basic drive transmission is known. Also, Oechsler has recommended the use of such a drive transmission in systems for driving the vents in a vehicle instrument panel to open and close. That is, such transmissions have been known within vehicle HVAC systems, but not for the vents for selectively communicating between a series of passages.

Figure 4:
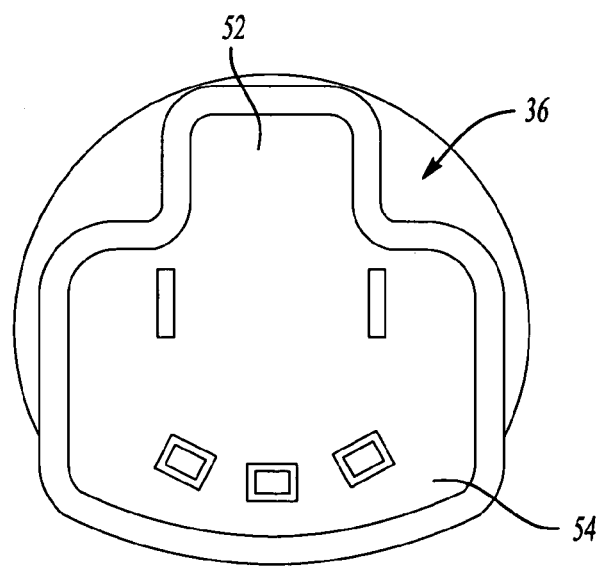
FIG. 4 is an end view along line 4—4 as shown in FIG. 2B.

In addition, and as shown in FIG. 4, the electrical connection 36 has a lobe 52 extending from a main portion 54. Now, when the control connection is connected into the lobe 52 and main portion 54, due to the non-symmetrical shape of the electrical connection 36, one will be ensured that the connection is properly made, and the door is properly orientated.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle HVAC system comprising:
   a first flow line selectively communicating with a pair of branched flow lines;
   a vent door pivoting to selectively communicate said first flow line with said pair of branched flow lines, said vent door having a pivoting shaft in a door body; and
   a motor for driving said vent door to pivot to selectively communicate said branch flow lines to said one flow line, said motor being housed within said shaft.

2. The vehicle HVAC system of claim 1, wherein said first flow line is a supply shaft for supplying air to a vehicle cabin, and said branched flow lines selectively direct air to vertically upper and lower positions within a vehicle cab.

3. The vehicle HVAC system of claim 1, wherein said branched flow lines selectively communicate with heated and cooled air sources and selectively communicate heated and cooled air to said first flow line as a downstream line.

4. The vehicle HVAC system of claim 1, wherein said motor drives a non-cylindrical shaft, said non-cylindrical shaft driving a lobed member, said lobed member driving a first ring having a toothed outer periphery, said toothed outer periphery driving an internally toothed member which is fixed to rotate with said shaft.

5. The vehicle HVAC system of claim 1, wherein a control is attached to an electrical connection at an end of said shaft to supply control signals to said motor.

6. The vehicle HVAC system of claim 5, wherein said connection is non-symmetrical.

7. The vehicle HVAC system of claim 5, wherein at least one sensor senses a rotational position of said shaft, and provides feedback to said control, said sensor being mounted within said shaft.

8. A vehicle HVAC system of claim 7, wherein said sensor is a photointerupter.

9. A vehicle HVAC system as set forth in claim 7, wherein said sensor is a Hall effect sensor.

10. The vehicle HVAC system of claim 7, wherein said sensor uses pulse count principles.

11. The vehicle HVAC system of claim 7, wherein said sensor uses resistive strip principles.

12. The vehicle HVAC system of claim 1, wherein said motor is a stepper motor.

13. The vehicle HVAC system of claim 1, wherein said shaft has an outer dimension, and said motor has an outer dimension that is less than said outer dimension of said shaft.

14. A vehicle HVAC system comprising:
   a door pivoting to selectively communicate a first flow line with a pair of branched flow lines, said door having a pivoting shaft in a door body;
   a motor housed within said shaft for driving said door to pivot,
   a control attached to said motor for sending control signals to said motor; and
   at least one sensor mounted within said shaft for providing feedback of a position of said shaft to said control.

15. The vehicle HVAC system of claim 14, wherein said motor drives a non-cylindrical shaft, said non-cylindrical shaft driving a lobed member, said lobed member driving a first ring having a toothed outer periphery, said toothed outer periphery driving an internally toothed member which is fixed to rotate with said shaft.

16. The vehicle HVAC system of claim 14, wherein an electrical connection between said motor and said control is non-symmetrical.

17. A vehicle HVAC system of claim 14, wherein said sensor is a photointerupter.

18. A vehicle HVAC system as set forth in claim 14, wherein said sensor is a Hall effect sensor.

19. The vehicle HVAC system of claim 14, wherein said sensor uses pulse count principles.

20. The vehicle HVAC system of claim 14, wherein said sensor uses resistive strip principles.

21. The vehicle HVAC system of claim 14, wherein said motor is a stepper motor.

22. The vehicle HVAC system of claim 14, wherein said shaft has an outer dimension, and said motor has an outer dimension that is less than said outer dimension of said shaft.

* * * * *